United States Patent [19]

Malott et al.

[11] 3,929,197

[45] Dec. 30, 1975

[54] LATERAL ROLL IRRIGATION MACHINE HAVING REMOTE END CONTROL

[75] Inventors: Corwin Malott; Robert William Erath, both of Spokane, Wash.

[73] Assignee: Alumax Mill Products, Inc., Spokane, Wash.

[22] Filed: Jan. 6, 1975

[21] Appl. No.: 538,914

[52] U.S. Cl. ............... 180/2; 123/179 A; 180/98; 239/212; 290/DIG. 3; 180/103
[51] Int. Cl.² ............................................ B60K 23/00
[58] Field of Search ............ 180/2, 103, 14 R, 82 R, 180/98, 1 R; 239/177, 178, 212; 290/DIG. 3, 38 C; 123/179 A, 179 R

[56] References Cited
UNITED STATES PATENTS

| | | | |
|---|---|---|---|
| 3,303,821 | 2/1967 | Harris | 180/2 X |
| 3,398,806 | 8/1968 | Hendricks | 180/2 |
| 3,606,160 | 9/1971 | Bonds et al. | 239/212 |
| 3,675,032 | 7/1972 | Shaheen | 290/DIG. 3 |
| 3,831,706 | 8/1974 | Nordine | 180/98 |

Primary Examiner—Leo Friaglia
Assistant Examiner—John P. Silverstrim
Attorney, Agent, or Firm—Wells, St. John & Roberts

[57] ABSTRACT

A lateral roll irrigation system is described having a central drive unit for propelling the system over a field in which the operation of the drive unit is controlled from an operators console at one end of the system. The power unit has an internal combustion engine that is started by a starter. The engine has a choke. The RPM of the engine is monitored by a tachometer. The power unit utilizes a hydraulic transmission system for moving the irrigation system in either direction. The irrigation system has a remote operational control subsystem which includes the remote control console for sequentially starting the engine and moving the irrigation system in either direction. The operational control subsystem includes a digital-to-analog converter at the remote console for transmitting an analog signal over a single conductor extending from the console to the drive unit. The transmitted analog signal is converted at the power unit to discrete digital signals which are processed by a logic switching network to sequentially perform the desired manipulative steps intended by the operator.

16 Claims, 5 Drawing Figures

LATERAL ROLL IRRIGATION MACHINE HAVING REMOTE END CONTROL

BACKGROUND OF THE INVENTION

This invention relates to mobile irrigation systems and more particularly to lateral roll irrigation systems having power drive units.

A lateral roll irrigation system generally has a central reversible drive system for moving the pipe line across the field in either direction. The grower or operator generally has to walk to the central location of the drive unit to start the motor and manipulate control levers to move the irrigation system in either direction. Frequently the foliage is quite damp and the operator or grower becomes wet in the process of walking across the field to and from the central drive unit. Additionally, the walk is quite time consuming and there is a danger that the grower will damage the crop in his path.

Considerable effort has been expended to develop a remote control system to enable the grower to operate, or to control the movement of the system from a remote end position. However such efforts in the past have been expensive and rather unreliable.

One of the principal objects of this invention is to provide a mobile lateral roll irrigation system having a remote control system that is quite reliable.

An additional object of this invention is to provide a mobile lateral roll irrigation system having a remote control system in which a single wire extends from a remote location to the central drive unit.

A further object of this invention is to provide a mobile lateral roll irrigation system having a central drive in which a remote control system is rather inexpensive to manufacture and reliable in operation.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which.

DETAILED DESCRIPTION OF THE PREFERRED EMBODIMENT

Figure 1:
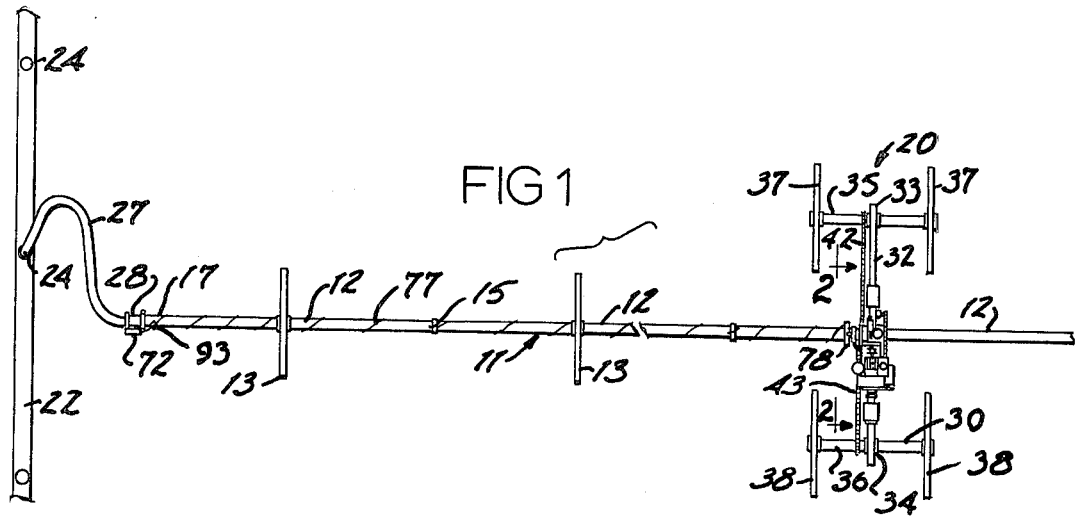
FIG. 1 is a fragmentary schematic plan view of a mobile lateral roll irrigation system illustrating a central drive unit for propelling the irrigation system in either direction in which the drive unit is controlled from a remote control console at one end of the system.
Figure 3:
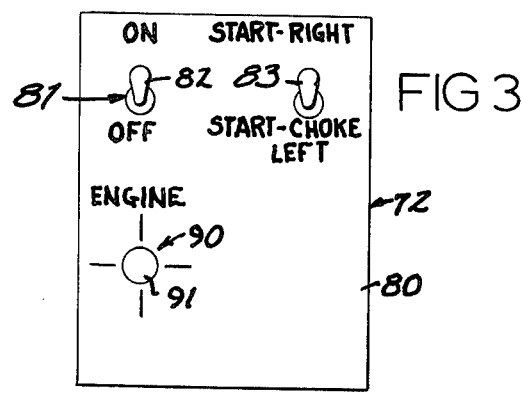
FIG. 3 is a face view of the remote control console.

Referring now in detail to the drawing, there is illustrated in FIG. 1 a mobile lateral roll irrigation system generally designated with the numeral 10 composed of an elongated irrigation pipeline 11 having a plurality of end-to-end connected pipeline sections 12. The irrigation pipeline 11 is supported above the ground by coaxial wheels 13 in which the pipeline 11 forms the axle for the wheels and is utilized in driving the wheels in either direction. A plurality of sprinklers 15 are mounted on the pipeline 11 at space locations to distribute irrigation water onto the field along the length of the pipeline 11. The pipeline 11 is connected to the source of water at one end 17 from a header irrigation line 22. The header irrigation line 22 has outlets 24 spaced therealong to enable the pipeline 11 to be connected to the line 22 at various spaced locations to irrigate a field. Generally a flexible conduit 27 is utilized to connect end 17 with outlet 24. A coupling 28 is generally provided on the flexible coupling to connect with the end 17.

The irrigation system 10 has a central power unit 20 for moving irrigation pipeline 11 in either direction. For purposes of illustration the irrigation pipeline will be referred to as moving "left" or "right" as viewed from the end 17 looking toward the power unit 20.

Power unit 20 is centrally positioned along the pipeline 11 intermediate the ends of the pipeline. The power unit 20 rotates the pipeline 11 which in turn rotates the wheels 13 to move the pipeline in either direction.

The power unit 20 specifically has a mobile frame 30 that includes an elongated crossbar 32 that extends transversely to either side of the pipeline having axle bearings 33 and 34 at ends thereof respectively for receiving wheel axles 35 and 36 respectively. Axle 35 has a set of drive wheels 37 affixed thereto. Axle 36 has a set of drive wheels 38 affixed to the ends thereof.

The power unit 20 has a main drive gear or "bull" gear 40 affixed coaxially to the pipeline for transmitting rotational force to the pipeline. Additionally, the power unit 20 has drive sprockets (not shown) affixed to the pipeline with drive chains 42 and 43 respectively extending from the pipeline to the respective axles 35 and 36 for driving the wheels 37 and 38 in unison with the rotation of the pipeline 11.

Figure 2:
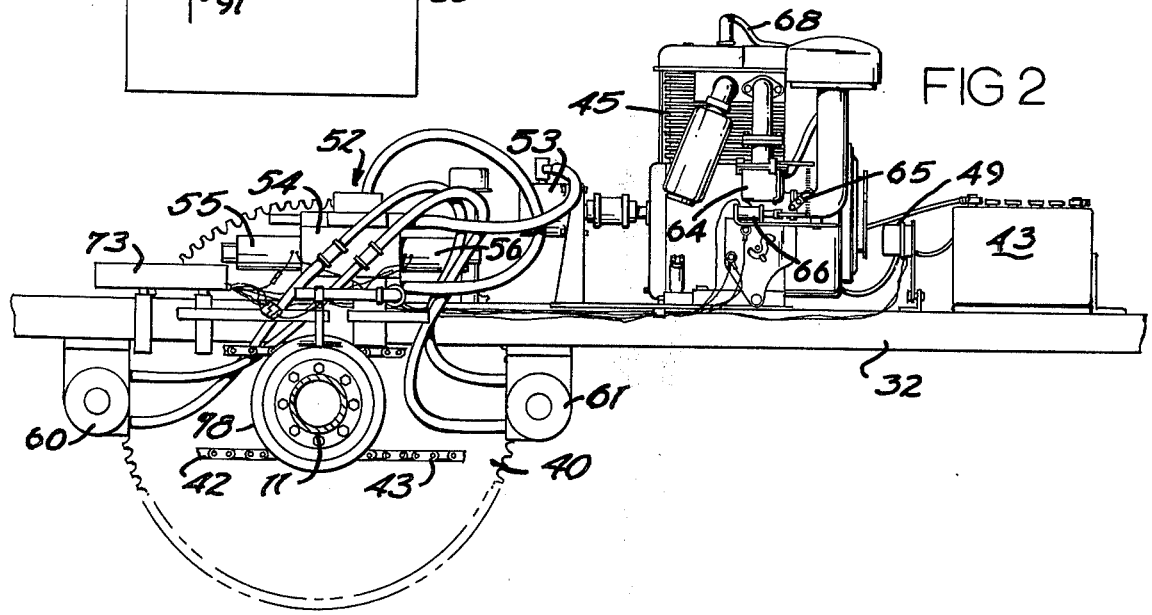
FIG. 2 is a vertical cross sectional view taken along line 2—2 in FIG. 1 illustrating components of the drive unit.

The power unit includes an internal combustion engine 45 preferably a gasoline engine that is mounted on the crossbar 32 (FIG. 2). The internal combustion engine has a starter-generator unit 47 (FIG. 4) affixed thereto for starting the internal engine from a source battery 48. A voltage regulator 49 is mounted electrically between the battery 48 and the starter-generator unit 47 for regulating the voltage applied therebetween. The starter-generator unit 47 is energized by a starter solenoid or relay 50.

The power unit 20 further includes a reversible drive means 52 (FIGS. 2) that is operatively connected to the output of internal combustion engine 45 for driving the bull gear 40.

The drive means 52 preferably includes a hydraulic transmission having a hydraulic pump 53 directly connected to the output of the internal combustion engine. Fluid from the hydraulic pump 53 is communicated to a double acting spool valve 54 having activating solenoids 55 and 56 at opposite ends. Valve solenoid 55 is associated with driving the irrigation pipeline to the right and valve solenoid 56 is associated with driving the pipeline 11 to the left. Valve solenoid 55 when energized communicates the hydraulic fluid in one direction from the hydraulic pump 53 to hydraulic motors 60 and 61. Valve solenoid 56 when energized directs the hydraulic fluid in the opposite direction from the pump 53 to hydraulic motors 60 and 61.

Additionally, the internal combustion engine 45 has a carburetor 64 for mixing the fuel charge with an initial fuel combustion assist means preferably a choke 65 for assisting in starting the engine. The choke 65 is operated by the choke solenoid 66. Additionally, the internal combustion engine has an engine stopping means preferably an ignition system generally designated with the numeral 68 (FIG. 4).

Figure 4:
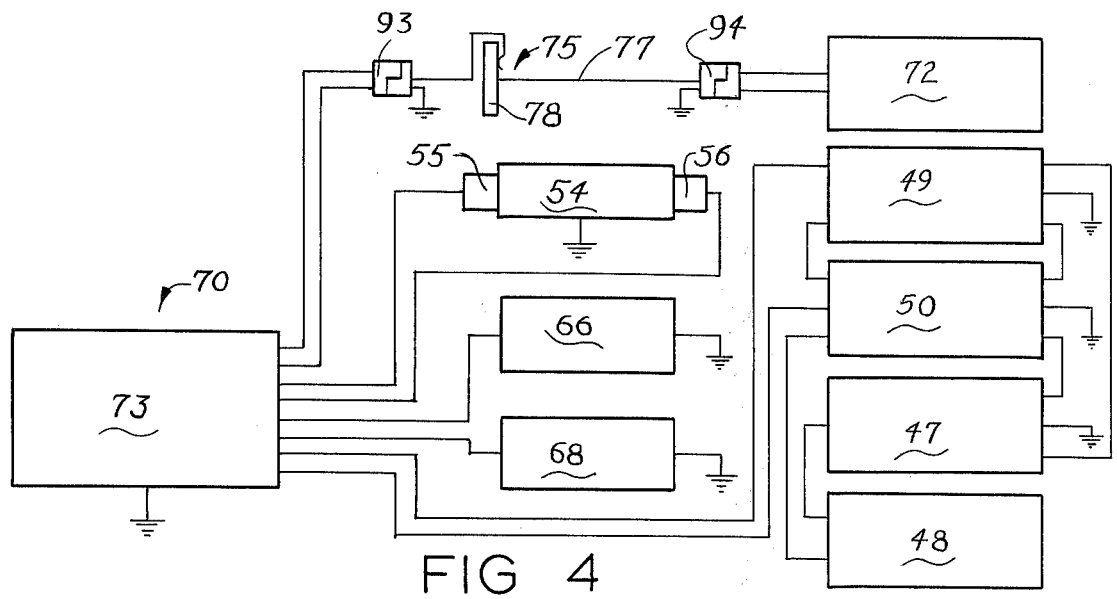
FIG. 4 is an electrical wiring diagram illustrating the general electrical system for operating the drive unit.
Figure 5:
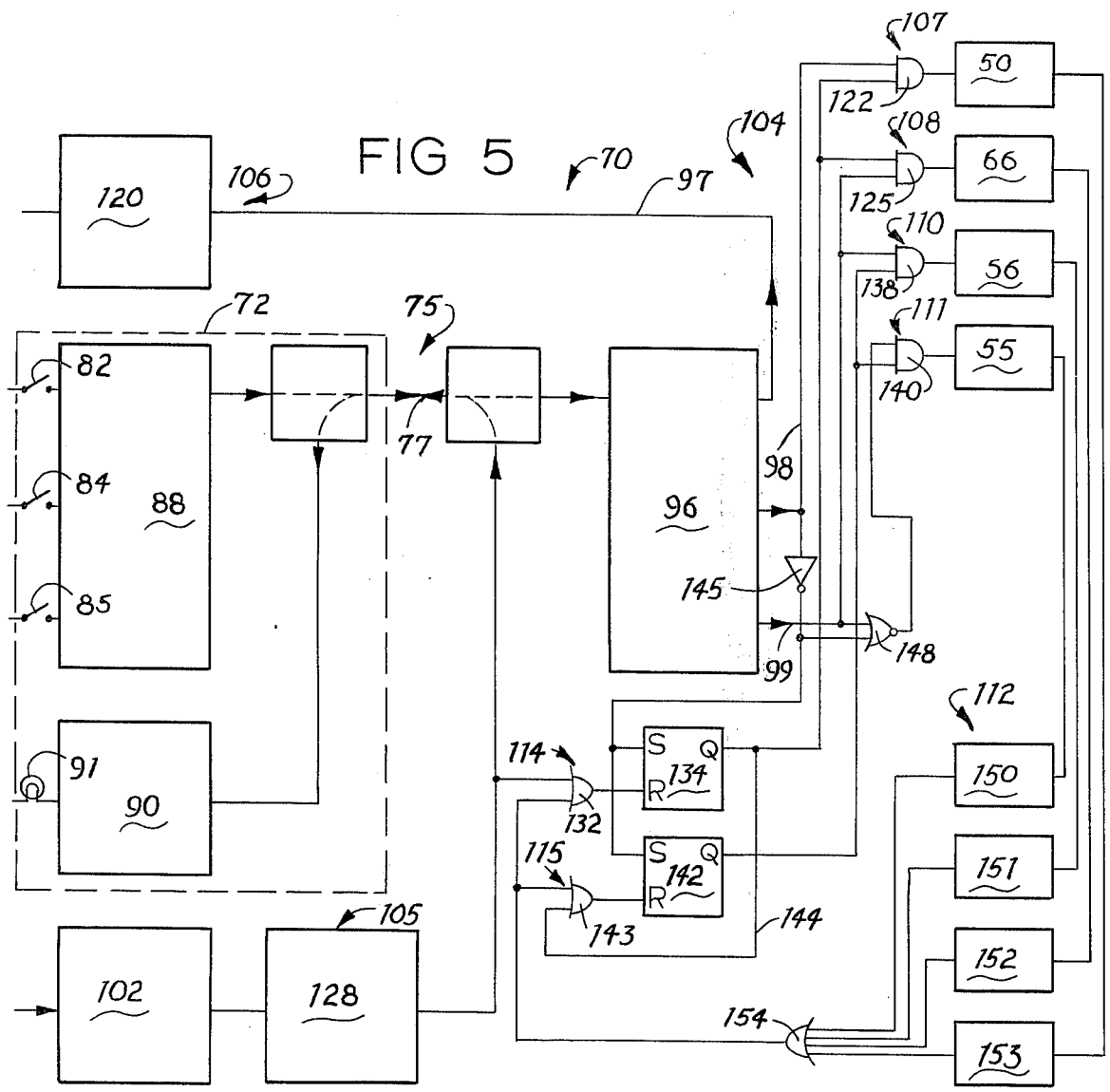
FIG. 5 is an electronic functional block diagram illustrating the control and logic circuit system to remotely control the drive unit.

The lateral roll irrigation system 10 further includes a remote operational control means generally designated with the numeral 70 that is illustrated in schematic and block form (FIGS. 4 and 5.).

One of the principal components of the operational control means 70 is portable remote control operators console 72 (FIGS. 1, 2) that may be positioned remote from the power unit 20 and preferably adjacent end 17. The operator console 72 transmits instructions from the end 17 to a power unit implementation control panel 73 mounted on the power unit 20. The remote operator console 72 and the implementation control panel 73 are coupled through a remote signal transmission system 75 that is preferably comprised of a wire 77 (FIGS. 1, 4 and 5) having a single conductor that extends from the end 17 to the power unit 20. The single conductor wire 77 is operatively interconnected to the implementation control panel 73 through a slip ring 78 adjacent the power unit 20. Alternatively, the remote signal transmission system may be a radio frequency system for sending signals from the remote console 72 to the panel 73 through the air.

The portable remote control operator console 72 may be mounted to the end 17 by conventional means or hand held adjacent the end 17 when it is desired to operate the power unit 20 and it may be removed from the vicinity of the end 17 when the power unit 20 is not in use. The remote control console 72 includes a console panel 80 having operator initiated input means for generating discrete digital signals that are multiplexed and transmitted to the implementation control panel 73 for operating the drive unit to (1) activate or deactivate the ignition system 68; (2) start internal combustion engine 45 with or without the use of the choke 65; and (3) operating the drive means 52, once the engine is running, to move the irrigation system either to the left or to the right.

Specifically console panel 80 includes a system "on" input means 81, which in a preferred form includes a two-position switch 82, with a labeled ignition ON in the closed position and ignition OFF in the open position. Additionally, the remote control console panel 80 has an operator command input means, which in a preferred form includes a three-position switch 83 having mutually exclusive switch contacts 84 and 85 illustrated in FIG. 5. The three-position switch has a first position in which the switch contacts 84 are closed and may be referred to as the "start/right" position and a second position in which switch contact elements 85 are closed and which may be referred to as the "start-choke/left" position. The two operational positions are spaced by a neutral position. The three-position switch 83 is spring biased so that when pressure is released from the switch it will automatically move to the neutral position in which the switch contacts 84 and 85 are automatically opened. The output from the switch elements form separate digital signals which are fed to a multiplexer or converter 88 that converts the separate digital signals to discrete multiplex signals preferably multilevel signals according to a preselected code. Specifically in this embodiment the multiplexer 88 is a three line digital to one line discrete multilevel converter for transmitting the coded multilevel signals in a preselected mode over the signal transmissions system 75 to drive unit implementation control panel 73. In the preferred embodiment the transmission system 75 has disconnect couplings 93 and 94 (FIGS. 4) at the ends of the single conductor 77 for interconnecting the multiplexer 88 to implementation control panel 73. In an alternate embdiment, the couplings 93 and 94 and wire 77 may be replaced by a radio frequency transmitter and receiver.

Additionally the remote control panel 80 has a systems "on" and "running" indicator 90 in the form of a light 91. In a preferred embodiment, the light 91 is a light emitting diode which is illuminated when the internal combustion engine is running.

The implementation control panel 73 at the power unit 20 includes a demultiplexer or converter 96 for decoding the multilevel signals transmitted by the multiplexer 88 and selectively generating separate digital signals that are transmitted on line 97, 98 and 99. In a preferred embodiment, the demultiplexer 96 is a one-line multilevel to three-line digital converter. In this specific embodiment, the control means 70 is designed with a four level signal code having a first signal level in which no positive signal is transmitted (ignition OFF): a second signal level when the contacts of the two-position switch 82 are closed for ignition ON: a third signal level when the switch contacts 84 are closed for "start/right" and a fourth signal level when switch contacts 85 are closed for "start-choke/left."

The operational control means 70 further includes a tachometer 102 (FIG. 5) that is operatively connected to the internal combustion engine 45 to generate an analog signal that is representative of the engine RPM.

The operational control means 70 also includes a logic switching means 104 that is operatively connected to the demultiplexer 96 for receiving the discrete separate positive digital signals on lines 97, 98, and 99. The logic switching means includes a tachometer network 105 for receiving the analog signal from the tachometer 102 and to process such analog signal to sequentially operate solenoids in response thereto. The logic switching means 104 includes an engine stopping network 106 for controlling the ignition system 68. The logic means 104 further includes an "engine" starting network 107 that is operatively connected to the starting solenoid 50. The logic switching means 104 includes a choke network 108 that is operatively connected to the choke solenoid 66. The logic switching means 104 includes a left travel network 110 and a right travel network 111 that are operatively connected to the solenoids 56 and 55 respectively.

Additionally, the logic switching means 104 includes a current overload network 112 that is operatively connected to the networks 107, 108, 110 and 111 to deactivate the power to the solenoid 50, 55, 56 and 66 should overload conditions be encountered during the operation of the power unit 20. Additionally the logic switching means 104 includes two logic interlock networks 114 and 115 to integrate and sequence the operation of the control system.

The ignition network 106 includes magneto shorting switch 120 which is deactivated when a positive digital signal is transmitted on line 97 from the demultiplexer 96. Such a digital signal to the magneto shorting switch 120 has the effect of rendering the engine stopping system inoperative. When there is a zero state digital signal on line 97, then the engine cannot be started, or if the engine is running the engine will automatically stop. Changing the digital signal to zero on line 97 may be accomplished by placing the two-position switch 82 in the OFF position or by disconnecting the remote control console from the end 17 at the coupling disconnect 93. Should there be a failure in the signal transmission means 75 from the remote control console 72 to the implementation console 73, then the engine stopping system will automatically be rendered effective to stop the engine preferably by shorting the ignition system 68.

The starting net work 107 includes an AND gate 122 that is operatively connected to the starting solenoid 50. The AND gate 122 receives a digital signal on line 98. The choke network 108 includes an AND gate 125 that is operatively interconnected between line 99 and the choke solenoid 66.

The tachometer network 105 includes a threshold detector 128 that is set to generate a digital signal when the tachometer senses that the engine is exceeding a preselected RPM. The signal from the threshold detector 128 is connected to the logic interlock network 114 and is also transmitted through the single wire 77 to the engine running indicator 90 at the remote console 72 to indicate that the engine is "running."

The single wire 77 provides a by-directional channel so that the multilevel signals transmitted from the multiplexer 88 to the demultiplexer 96 may be in one mode and the signal from the threshold detector 128 to the engine running indicator 90 may be in another mode. In a preferred embodiment the multilevel signals from the multiplexer 88 to the demultiplexer 96 is in a "resistance" mode whereas the signal from the threshold detector 128 the engine running indicator is in a "current" mode. Other types of modes may be utilized in alternate embodiments.

The logic interlock network 114 includes Or gate 132 that is operatively connected to the "reset" terminal of a R-S flip-flop 134 with overriding reset to receive the output from the threshold detector 128 to reset the flip-flop 134 when the engine is "running" to terminate or de-energize the starter solenoid 50 and the choke solenoid 66. The output from the flip-flop 134 is connected to both AND gates 122 and 125. The "set" terminal of the flip-flop 134 is operatively connected to line 98 through a logic level inverter 145 to set the flip-flop. The inverter 145 generates a zero signal when a positive digital signal is on line 98 and generates a positive signal when there is a zero digital signal on line 98.

To start the engine the operator plugs or connects the remote control console 72 to the disconnect 93 at end 17 and then places the switch 82 to the ON position. If there is electrical continuity between the remote console 72 and the panel 73, then the light 91 will dimly illuminate. The converter 88 generates a second level signal which is converted to a positive digital signal on line 97 to turn on the engine ignition system 68. Line 98 is zero, with the output of the inverter 145 being positive to "set" flip-flop 134. The operator then either pushes the three-position switch 83 to the "start/right" position or to the "start-choke/left" position depending upon whether or not the operator desires to choke the engine. Assuming that the operator pushes the switch 83 to the "start/right" position, the converter 88 generates a third level signal which in turn produces positive digital signals on lines 97 and 98 to turn "on" AND gate 122. Although the inverter 145 places a negative signal on the flip-flop 134 the flip-flop remains in its present state and generates a positive signal to AND gates 122 and 125. This turns AND gate 122 ON energizing the starter solenoid 50 to start the engine.

As the engine starts, the tachometer 102 monitors the RPM of the engine and when the engine RPM exceeds the preselected value, the threshold detector 128 transmits a positive signal to the OR gate 132 which in turn resets the flip-flop 134 to turn AND gates 122 and 125 off, thereby de-energizing starter solenoid 50 and the choke solenoid 66. Additionally, the threshold detector 128 brightly illuminates light 91 to indicate to the operator that the engine is running. As long as there is a positive reset signal at the flip-flop 134, a positive signal from the invertor 145 cannot set the flip-flop 134.

The left travel network 110 includes an AND gate 138 that is operatively connected to the solenoid 56 and line 99. The right travel network 111 includes an AND gate 140 connected to solenoid 55 and a NOR gate 148 connected to one input of the AND gate 140.

The logic interlock network 115 includes a R-S flip-flop 142 with overriding reset in which the output of the flip-flop 142 is connected to both AND gates 138 and 140. Additionally, the logic interlock network 115 includes a OR gate 143 that is connected to the reset on the flip-flop 142. The output of the flip-flop 134 is operatively connected to the OR gate 143 through a feedback line 144. As long as the flip-flop 134 produces an output positive signal, flip-flop 142 is in the reset condition and a negative signal is impressed upon the AND gate 138 and 140 to turn them off.

After the engine has started, it is necessary that the three position switch 83 be released to enable the switch pole to move to the neutral condition before further operation or movement of the irrigation system may be accomplished. When the switch 83 is moved to the neutral position, zero digital signals on lines 98 and 99 are produced with the inverter 145 impressing a positive signal at the set input of the flip-flops 134 and 142. Since there's no reset signal to flip-flop 142, a positive output is produced by flip-flop 142 and applied to AND gates 138 and 140. From the neutral position, the operator may again move the switch 83 to either the "start/right" position or the "start-choke/left" position. Assuming that the operator pushes the switch 83 to the "start-choke/left" position, positive digital signals on lines 98 and 99 turn the NOR gate 148 off and turns the AND gate 138 on to energize the left solenoid 56 to move the irrigation system to the left. The solenoid 56 will continue to be energized as long as the switch 83 is in the "start-choke/left" position and the engine is running. Should the engine stop for any reason, such as being out of gas, the AND gates 138 and 140 will automatically be turned off.

Assuming the engine is running and the operator moves the switch 83 to the "start/right" position, the NOR 148 gate will be turned on, turning AND gate 140 "on" to energizing the right solenoid 55 and moving the irrigation system to the right. The flip-flop 134 serves as the logic interlock network 114 to prevent the logic switching means 104 from sequencing back from the run logic condition to the start logic condition unless the switch 83 is allowed to move back to the neutral position. It is purposely intended that should the engine stall, while the system 10 is moving in either direction, that the logic switching means 104 through the flip-flop 134 will not sequence to the start condition and energize the starter solenoid 50 to run the system utilizing only the battery. It is necessary that the switch 83 move back to the neutral position to initiate the starting sequence.

The current overload network 112 includes a plurality of current overload detectors 150, 151, 152, 153 for detecting current overloads to the solenoid 50, 55, 56 and 66 to protect the logic switching means 104. The output from the detectors 150–153 is directed to an OR gate 154 which is in turn connected to the OR gate 143 and the OR gate 132 to reset the flip-flops 134 and 142 to turn the AND gates 122, 125, 138 and 140 off. As soon as the overload condition is corrected the system may be reactivated.

It should be noted that it is necessary to provide continuous positive output signal from the demultiplexer 96 to operate the control system. Thus should any malfunction occur in the transmission of multilevel signals from the remote control console 72 to the drive unit implementation control panel 73, the system will automatically shut down.

It should be noted that the switch 83 is utilized for generating signals both in the start condition and in the run condition in which the tachometer 102 in conjunction with the logic switching means 104 sequences the operation from the start condition to the run condition and then from the run condition back to the start condition under certain circumstances. Sufficient logic interlocks 114 and 115 are provided to prevent the starter solenoid 50 or the choke solenoid 66 from being energized while the system is moving. The starter solenoid 50 may not be energized at the same time that the hydraulic solenoids 55 and 56 are energized. This prevents the system from continuing running after the engine stalls. The drive solenoids 55 and 56 may not be operated until the engine comes up to a running speed. Additionally, it should be noted that in the preferred embodiment only a single wire is utilized for transmission of the signals from the remote control panel at the end 17 to the central drive unit 20. The single wire 77 is utilized in a duplex or multi-mode condition with multilevel signals in one mode being sent from the multiplexer 88 to the demultiplexer 96 and with a signal being transmitted in another mode from the tachometer 102 to the light 91 over the same wire 77. The pipeline 11 serves as a common ground to complete the circuit with the single conductor wire.

It should be understood that the above described embodiment is simply illustrative of the principles of this invention and that numerous other embodiments may be readily devised by those skilled in the art without deviating from the principles thereof. Therefore, only the following claims are intended to define this invention.

What is claimed is:

1. A lateral move irrigation pipeline system, comprising:
    an elongated irrigation pipeline;
    a plurality of longitudinally spaced wheels coaxially mounted on the pipeline to support the pipeline above the ground level and to enable the pipeline to be moved laterally across a field;
    a wheeled power unit mounted to the pipeline intermediate the ends of the pipeline for moving the wheel-supported pipeline in either lateral direction;
    said power unit having an internal combustion engine with an engine starting means, an engine stopping means and a drive means selectively operatively connected to the internal combustion engine and the pipeline;
    remote operation control means operatively connected to the engine starting means, the engine stopping means and the drive means for selectively rendering effective the engine starting means, the engine stopping means and the drive means remotely from the power unit;
    said remote operational control means having a remote control console having operator controlled switching means for selectively generating separate command digital signals (1) to energize the engine starting means to start the engine, (2) to stop the engine, and (3) to energize the drive means to drive the wheeled pipeline laterally;
    said remote control console having a multiplexer for converting the command digital signals and formulating a multiplex signal according to a selected code;
    a demultiplexer at the power unit for converting the multiplex signal and formulating separate instructional digital signals according to the selected code;
    a signal transmission means operatively interconnecting the multiplexer and the demultiplexer to transmit the multiplex signal therebetween;
    logic switching means at the power unit operatively interconnecting the demultiplexer with the engine starting means, the engine stopping means and the drive means to selectively activate same in response to the separate instructional digital signals.
    a tachometer operatively connected to the engine for generating an analog signal responsive to the magnitude of the engine RPM: and
    wherein said logic switching means further includes a logic interlock network means responsive to the analog signal generated by the tachometer for deactivating the engine starting means when the engine reaches a pre-selected RPM.

2. The system as defined in claim 1 wherein the engine starting means includes an electrical solenoid and wherein the drive means includes at least one electrical solenoid and wherein the logic switching means includes a logic interlocking network responsive to the electrical current supplied to the solenoids for deactivating power to the solenoids when an excess current is supplied to any one of the solenoids 3. The system as defined in claim 1 wherein the operator controlled switching means includes means at the remote control console for generating and terminating an operator initiated command digital signal; and
    said logic switching means having an engine start network that is responsive to the generation of said operator initiated command digital signal for energizing the engine starting means when the engine speed is below the pre-selected RPM and a drive means network that is responsive to the generation of said same operator initiated command digital signal for energizing the drive to move the pipeline in the one lateral direction when the engine speed exceeds the pre-selected RPM.

4. The system as defined in claim 3 wherein said logic interlocking means being responsive to the generation and termination of the operator initiated command digital signal in addition to being responsive to signal generated by the tachometer for automatically rendering effective the drive means network when the engine speed exceeds the pre-selected RPM and the operator initiated command signal is sequentially terminated and then regenerated.

5. The system as defined in claim 4 wherein said logic interlocking means includes means for automatically rendering ineffective the drive means network to de-energize drive means when the engine speed falls below the preselected RPM.

6. The system as defined in claim 4 wherein said logic interlocking means includes means for preventing the engine start network from being rendered effective to restart the engine once the engine speed falls below the pre-selected RPM unless the operator initiated command signal is sequentially terminated and then regenerated.

7. The system as defined in claim 3 wherein the drive means is reversible and capable of selectively moving the irrigation pipeline in either lateral direction and wherein the drive means network includes a one directional network for activating the drive means to move the pipeline in one lateral direction and an opposite directional network for activating the drive means to move the pipeline in the opposite lateral direction.

8. The system as defined in claim 3 wherein the multiplexer generates a discrete level multiplex signal in response to each separate operator initiated digital command signal.

9. The system as defined in claim 3 wherein signal transmission means includes a single conductor wire for transmitting the multiplex signal from the multiplexer to the demultiplexer.

10. The system as defined in claim 3 wherein the operator controlled means include means at the remote control console for generating a second operator initiated digital command signal;
said drive means network being responsive to the generation of said second operator initiated digital command signal for energizing the drive means to move the pipeline in the opposite lateral direction when the engine speed exceeds the pre-selected RPM.

11. The system as defined in claim 3 wherein the operator controlled means includes means at the remote control console for generating and terminating a system "on" digital command signal; and wherein the logic switching network includes an engine stopping network responsive to the generation and termination of the systems "on" digital command signal for rendering ineffective the engine stopping means when the systems "on" digital command signal is generated and for rendering effective the engine stopping means when the system "on" digital command signal is terminated.

12. The system as defined in claim 1 wherein the remote control console includes a visual indicator that is operatively connected to the logic switching means to provide a visual indicator that the engine is running when the engine RPM exceeds the preselected value.

13. The system as defined in claim 1 wherein the power unit includes a battery for providing power to the remote control console and to the engine starting means.

14. The system as defined in claim 1 wherein the internal combustion engine has a choke and wherein the system further comprises:
means for operating the choke; and
wherein the operational control means is operatively connected to the choke operating means;
said logic switching means having a network responsive to the signal from the tachometer for energizing the choke operating means when the RPM of the engine is less than the pre-selected value and for automatically de-energizing choke operating means when the RPM of the engine exceeds the pre-selected value.

15. The system as defined in claim 14 wherein the remote control console has switch means for generating operator initiated command signal; said logic switching means having a choke-start network that is reponsive to the generation of the operator initiated command signal for activating both the engine starting means and the means for operating the choke.

16. A lateral move irrigation pipeline system, comprising:
an elongated irrigation pipeline;
a plurality of longitudinally spaced wheels coaxially mounted on the pipeline to support the pipeline above the ground level and to enable the pipeline to be moved laterally across a field;
a wheeled power unit mounted to the pipeline intermediate the ends of the pipeline for moving the wheel-supported pipeline in either lateral direction;
said power unit having an internal combustion engine with an engine starting means, an engine stopping means, an engine carburetor choke means and a drive means selectively operatively connected to the internal combustion engine and the pipeline;
remote operation control means operatively connected to the engine starting means, the engine stopping means, the engine carburetor choke means and the drive means for selectively rendering effective the engine starting means, the engine stopping means, the engine carburetor choke means and the drive means remotely from the power unit;
said remote operator control means having a remote control console having operator controlled switching means for selectively generating a first command digital signal to inactivate the engine stopping means, a second command digital signal to activate either the engine starting means or activate the drive means to move the pipeline in one lateral direction, and a third command digital signal to activate either the engine starting means and the engine carburetor choke means or activate the drive means to move the pipeline in the opposite lateral direction;
said remote control console having a multiplexer for converting the selected command digital signals and formulating a multiplex signal;
a demultiplexer at the power unit for converting the multiplex signal and generating separate instructional digital signals corresponding to the selected command digital signals;
a signal transmission means operatively interconnecting the multiplexer and the demultiplexer to transmit the multiplex signal therebetween;
logic switching means at the power unit having (1) an engine stopping network responsive to the generated first instructional digital signal for inactivating the engine stopping means, (2) an engine starting network responsive to the generation of the second instructional digital signal for activating the engine starting means, (3) an engine choke network responsive to the generation of the third instructional digital signal for activating the engine carburetor choke, (4) a one lateral direction drive network responsive to the generation of the second instructional digital signal for activating the drive unit to move the pipeline in one lateral direction; and (5) an opposite lateral direction drive network responsive to the generation of the third instructional digital signal for activating the drive means to move the pipeline in the opposite lateral direction;

a tachometer operatively connected to the engine for generating an analog signal responsive to the magnitude of the engine RPM: and wherein said logic switching means further includes a logic interlock network means responsive to the analog signal generated by the tachometer (1) to render effective the engine starting network, and the engine choke network and to render ineffective the drive networks when the engine RPM is below a preselected value and (2) to render effective the drive networks and render ineffective the engine starting network and the engine choke network when the engine RPM is above the preselected valve.

* * * * *